United States Patent
Wu (10) Patent No.: US 11,818,580 B1
(45) Date of Patent: Nov. 14, 2023

(54) DETECTING UNAUTHORIZED ACCESS POINTS IN A NETWORK

(71) Applicant: Trend Micro Incorporated, Tokyo (JP)

(72) Inventor: Chun-Da Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 134 days.

(21) Appl. No.: 17/510,892

(22) Filed: Oct. 26, 2021

Related U.S. Application Data (63) Continuation of application No. 11/426,837, filed on Jun. 27, 2006, now abandoned.

(51) Int. Cl.
| | |
|---|---|
| *H04W 12/122* | (2021.01) |
| *H04W 12/08* | (2021.01) |
| *H04W 12/108* | (2021.01) |
| *H04W 12/71* | (2021.01) |
| *H04L 12/46* | (2006.01) |

(52) U.S. Cl.
CPC ......... *H04W 12/122* (2021.01); *H04W 12/08* (2013.01); *H04W 12/108* (2021.01); *H04W 12/71* (2021.01); *H04L 12/4641* (2013.01)

(58) Field of Classification Search
CPC . H04W 12/08; H04W 12/108; H04W 12/122; H04W 12/4641
See application file for complete search history.

(56) References Cited

U.S. PATENT DOCUMENTS

| | | | | |
|---|---|---|---|---|
| 2004/0107219 A1* | 6/2004 | Rosenberger | ........... | H04L 43/00 |
| 2006/0123133 A1* | 6/2006 | Hrastar | ............... | H04L 63/1491 |
| | | | | 709/240 |
| 2006/0206933 A1* | 9/2006 | Molen | ................. | H04L 63/0428 |
| | | | | 726/14 |
| 2009/0028118 A1* | 1/2009 | Gray | ................... | H04L 63/1416 |
| | | | | 370/338 |

* cited by examiner

*Primary Examiner* — Jamal Javaid
*Assistant Examiner* — Ryan C Kavleski
(74) *Attorney, Agent, or Firm* — Beyer Law Group LLP (57) ABSTRACT

Methods and apparatus for detecting, in a gateway device configured for facilitating communication between an intranet and an external network, the existence of an unauthorized wireless access point in the intranet. The method includes determining whether a packet received at the gateway originates from one of the wireless devices. If a received at the gateway originates from a wireless device, the method includes determining whether a source MAC address associated with the packet is one of the set of known MAC addresses. If not, the method further includes taking a remedial action to prevent the unauthorized wireless access point from accessing one of the intranet and the external network.

7 Claims, 5 Drawing Sheets

DETECTING UNAUTHORIZED ACCESS POINTS IN A NETWORK

BACKGROUND OF THE INVENTION

Computer networking has become pervasive in recent years. Nowadays, it is expected that most organizations implement some type of computer networking to allow its workers to exchange emails, data, and to access the internet.

In most organizations, networking is accomplished using a variety of medium, including the wired (or conductor) medium, the optical medium, and the wireless medium. In wireless networking, end nodes (such as individual's laptop computers, desktop computers, palmtop computers, and/or other consumer electronic devices) access the internet via a wireless access point ("access point"). The wireless access point serves as a device that allows the wireless end nodes to communicate using the wireless medium with the rest of the network.

Figure 1:
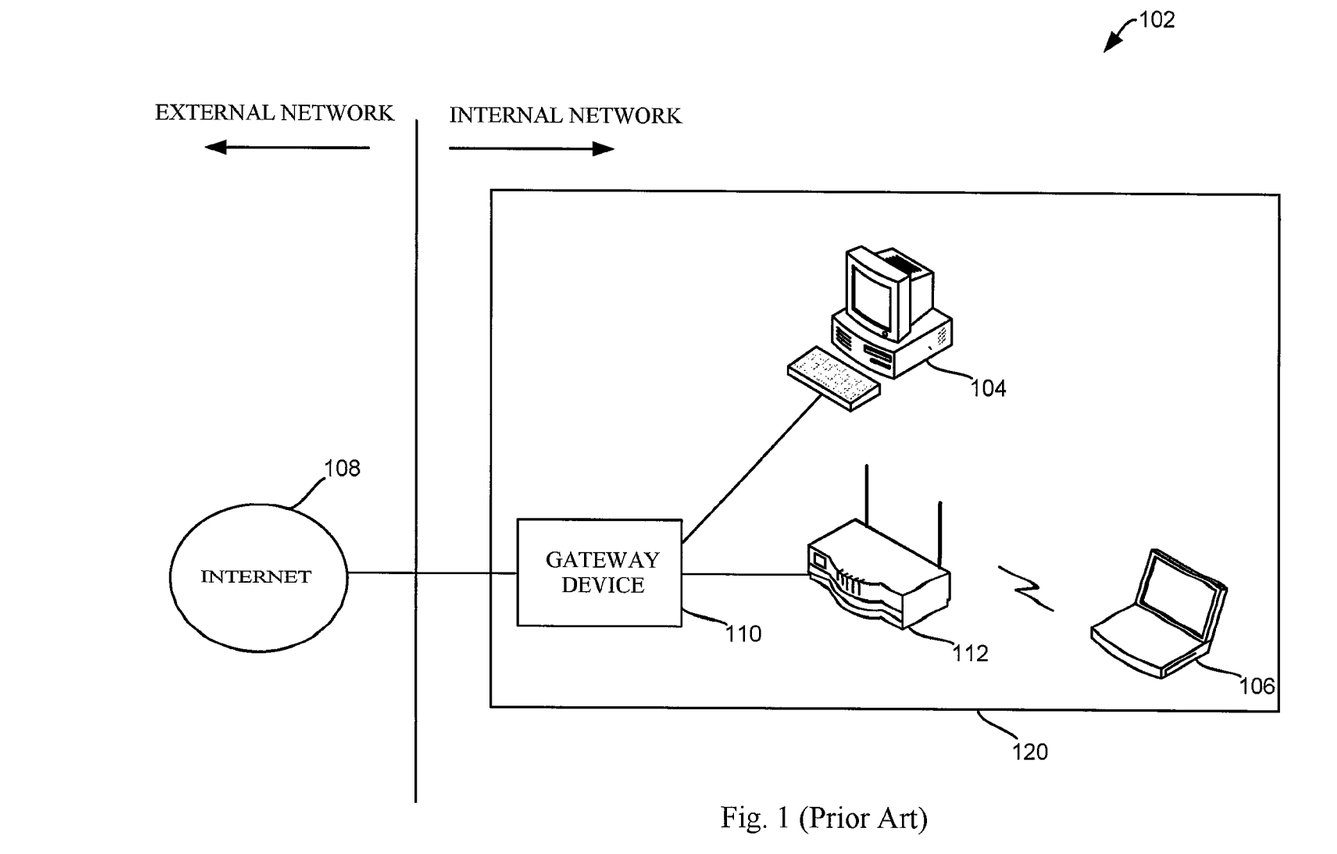
FIG. 1 is a prior art example of a simple network wherein two computers are configured to access the internet via a gateway device.

FIG. 1 is a prior art example of a simple network 102 wherein two computers 104 and 106 are configured to access the internet 108 via a gateway device 110. Computer 104 represents a desktop computer and communicates with gateway device 110 via a conductor (typically a CAT-5 or CAT-6 cable in the case of an Ethernet network). Computer 106, on the other hand, is a laptop computer and communicates with gateway device 110 via a wireless router 112, which acts as the access point for laptop computer 106. Note that even though wireless router 112 couples to the rest of the network via the conductor medium (e.g., CAT-5 or CAT-6 cable), wireless router 112 facilitates wireless communication with laptop computer 106 to allow laptop computer 106 to communicate with gateway device 110 and the internet 108. In the example of FIG. 1, gateway device 110, wireless router 112, and computers 104 and 106 form an internal network, or an intranet 120.

Although wireless networking offers convenience and mobility for the end nodes, there are serious security issues associated with wireless networking. For example, unless the signals between laptop computer 106 and wireless router/access point 112 are properly encrypted, these signals may be intercepted by an eavesdropping device, thereby compromising communication security. As another example, an unsecure access point 112 may allow an unauthorized user to access, using a computer equipped with a wireless network card, computers and servers (not shown) of intranet 120.

Because of the potential for a security breach, organizations are wary of implementing wireless networking. If wireless access is required, management in these organizations typically requires that both the access point (e.g., 112) and the wireless end nodes (e.g., laptop 106) be configured with encryption and access control software to limit the potential for a security breach. Since such configuration often requires a level of technical sophistication that is beyond that possessed by an average user, the task of provisioning wireless access is typically the responsibility of a trained IT (information technology) professional or an IT organization. In fact, security best practices require that every access point be configured by a properly trained professional since security weakness in a single access point may expose the entire intranet to unauthorized access.

Since wireless access provides an almost irresistible level of convenience, employees often find it expedient to purchase an inexpensive access point off the shelf, plug the access point into the existing intranet, and begin wireless computing. Such unauthorized access point provisioning, however, represents a potential security risk since the untrained employee often lacks adequate knowledge to properly secure the wireless access point. In some cases, the unauthorized access point may be completely unsecured, leaving the rest of the intranet vulnerable to unauthorized access.

Detecting unauthorized access points has thus become an important task for organizations. For example, an IT technician may walk around the building with a wireless-enabled laptop to detect available access points. A computer running the Windows XP operating system (available from the Microsoft Corporation of Redmond, Wash.) may be employed, for example, to view the available wireless networks at any given location. Although such detection does not pinpoint the location of the unauthorized access point, the detection of an unauthorized access point in a general location allows the IT technician to alert management that there exists an unauthorized access point in a particular building or on a particular floor so that management can communicate to employees regarding the need to remove such unauthorized access point.

It is believed by the inventors herein that commercially available wireless audit products may be employed to sniff or detect unauthorized access points. However, such wireless audit products tend to be expensive and require training by IT personnel to properly operate. IT organizations may also keep a white list of wireless devices MAC (media access controller) addresses. If packets are received from end nodes whose MAC addresses are not in the white list, these packets are flagged as suspicious and the access points through which these packets are transmitted may be flagged for investigation by IT personnel. However, the maintenance of such a white list is time-consuming and often result in "false alarms" since users sometimes replace their wireless modems (such as PCMCIA modem cards or USB modems) without informing the IT department.

SUMMARY OF INVENTION

In an embodiment, the invention relates to a computer implemented method, in a gateway device configured for facilitating communication between an intranet and an external network, for detecting the existence of an unauthorized wireless access point in the intranet. The intranet is configured such that wireless devices of the intranet can only access the gateway device via a set of wireless-authorized virtual local area networks (VLANs) associated with a set of known media access controller (MAC) addresses. The method includes determining whether a packet received at the gateway originates from one of the wireless devices. If the packet received at the gateway originates from the one of the wireless devices, the method includes determining whether a source MAC address associated with the packet is one of the set of known MAC addresses. If the packet received at the gateway both originates from the one of the wireless devices and the source MAC address associated with the packet is not the one of the set of known MAC addresses, the method further includes taking a remedial action to prevent the unauthorized wireless access point from accessing one of the intranet and the external network.

In another embodiment, the invention relates to a computer-implemented method, implemented in a gateway device configured for facilitating communication between an intranet and an external network, for detecting the existence of an unauthorized wireless access point in the intranet, the intranet being configured such that wireless devices of the intranet can only access the gateway device via a set of wireless-authorized virtual local area networks (VLANs) associated with a set of known media access controller (MAC) addresses. The method includes determining whether a source MAC address associated with a packet received at the gateway is not one of the set of known MAC addresses. If the source MAC address associated with the packet received at the gateway originates is not one of the set of known MAC addresses, the method includes determining whether the packet received at the gateway originates from one of the wireless devices. If the packet received at the gateway both originates from the one of the wireless devices and the source MAC address associated with the packet is not the one of the set of known MAC addresses, the method also includes taking a remedial action to prevent the unauthorized wireless access point from accessing one of the intranet and the external network.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, Opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment, the invention relates to a computer-implemented method and apparatus implemented in a gateway device for detecting the presence of an unauthorized wireless access point in an intranet. In embodiments of the invention herein, wireless devices that are authorized to access the intranet are logically organized in a set of virtual local area networks (VLANs) implemented using switches having known media access controller (MAC) addresses. In fact, the organization of wireless devices such that they only access the intranet via a set of known VLANs is a precondition for some embodiments of the invention.

Note that it is not absolutely required that the VLANs on which the wireless devices are implemented be dedicated only to wireless devices. However, it is important that wireless devices be confined only to a set of VLANs known to the gateway device to be VLANs on which authorized wireless access is permitted. These VLANs are referred to herein as "wireless-authorized VLANs."

As the term is employed herein, a virtual LAN is a logical network that may be implemented using any of the VLAN-enabling protocols such as IEEE 802.1Q, Inter-Switch Link (ISL) by Cisco Corporation of San Jose, Calif., Virtual LAN Trunk (VLT) by 3Com Corporation of Santa Clara, Calif. In a VLAN, the devices behave as if they are connected together to the same wire even though these devices may actually physically connect to different segments of a LAN. Being a virtual LAN, several VLANs can co-exist on a single physical switch, and many physical switches are endowed with software/firmware to enable the creation and maintenance of VLANs.

In an embodiment, packets received at the gateway is examined to determine whether they are associated with a wireless device or with a device that communicates using a conductive/optical medium (i.e., a non-wireless device). If the packet received at the gateway is determined to have been received from a wireless device, a further check is made to determine whether such packet arrived via an authorized wireless access point. Since embodiments of the invention require that all wireless devices access the intranet via the set of wireless-authorized VLANs, any packet received from a wireless device that did not arrive via one of the wireless-authorized VLANs is deemed to have arrived via an unauthorized wireless access point. In this case, the packet is flagged so that further action may be taken to ascertain the exact location of the unauthorized wireless access point.

Figure 2:
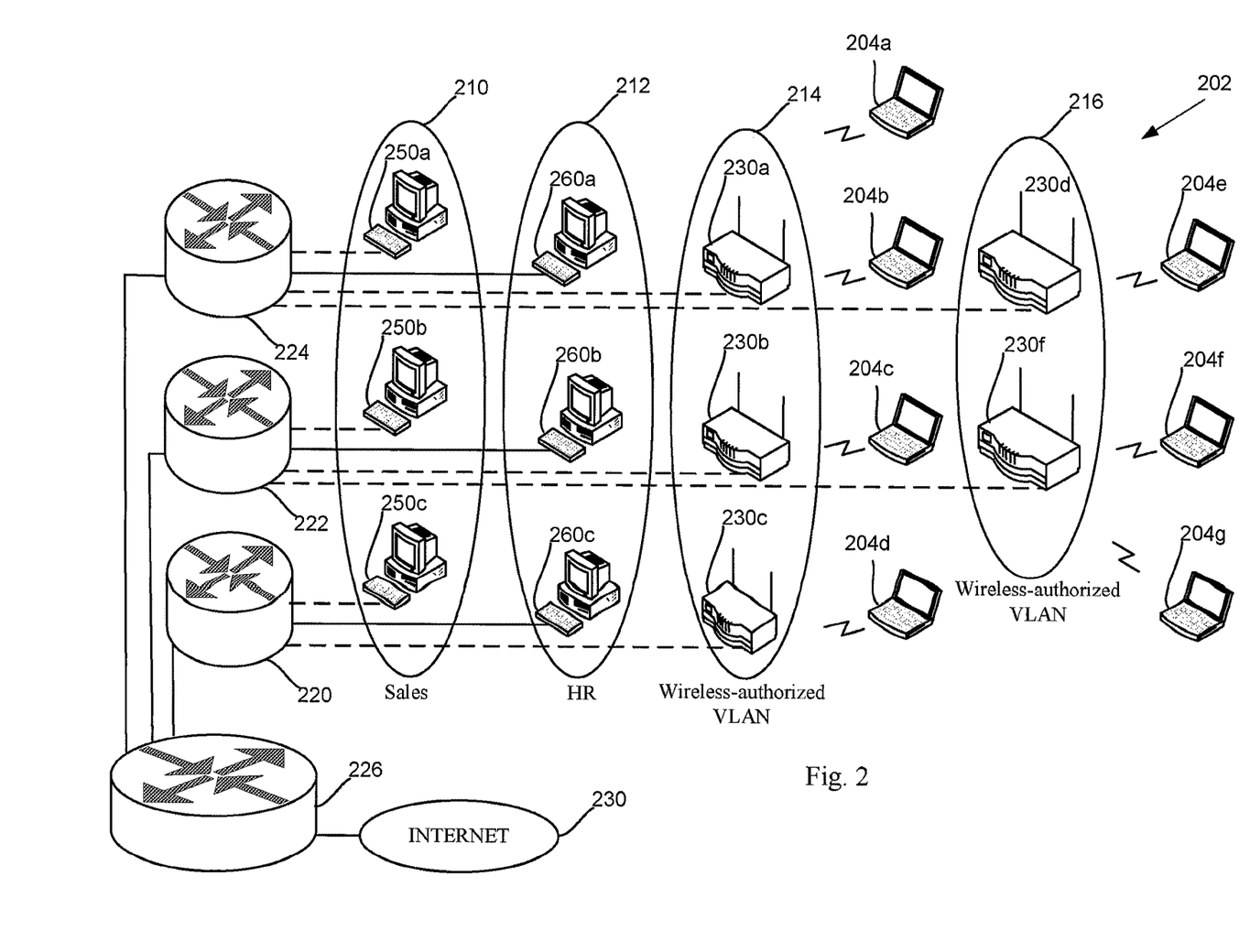
FIG. 2 shows, in accordance with an embodiment of the invention, an example intranet in which a plurality of wireless devices are configured to access the intranet only through a known set of wireless-authorized VLANs.

The features and advantages of the present invention may be better understood with reference to the figures and discussions that follow. FIG. 2 shows, in accordance with an embodiment of the invention, an example intranet 202 in which the wireless devices 204(a)-204(g) are configured to access the intranet only through a known set of wireless-authorized VLANs. In the example of FIG. 2, there are shown four VLANs 210, 212, 214, and 216 implemented via switches 220, 222, and 224. VLANs 214 and 216 are designated the wireless-authorized VLANs while wireless devices are not authorized on VLANs 210 and 212. Through VLANs 214 and 216 (shown as logical groupings of wireless routers 230(a)-230(c) and 230(d)-230(f) respectively), the wireless devices may communicate with other devices in intranet 202 and to the external network such as the internet 230 through a gateway device 226.

For completeness, VLAN 210 of the example of FIG. 2 represents the group "Sales" and is implemented to logically connect desktop computers 250(a)-(c) together in a virtual LAN. Likewise, VLAN 212 represents the group "HR" and is implemented to logically connect desktop computers 260(a)-(c) together in a logical LAN. Note that VLANs 210, 212, 214, and 216, being virtual, can all be implemented using the same set of physical switches 220, 222, and 224.

As discussed, a pre-condition for embodiments of the invention is that the wireless devices can only access the intranet through a set of wireless-authorized VLANs. The exact number of wireless-authorized VLANs in an intranet is not important. There may be one wireless-authorized VLANs in an intranet, or there may be dozens or hundreds. It is important, however, that wireless devices do not get implemented on VLANs that are not known to be wireless-authorized (such as VLANs 210 and 212, which are not wireless-authorized VLANs in the example of FIG. 2). The designation of which VLAN is wireless-authorized and which VLAN is not wireless-authorized may be pre-defined by an IT technician for a given intranet and may be tracked by the IT technician in a configuration database or table, for example.

Figure 3:
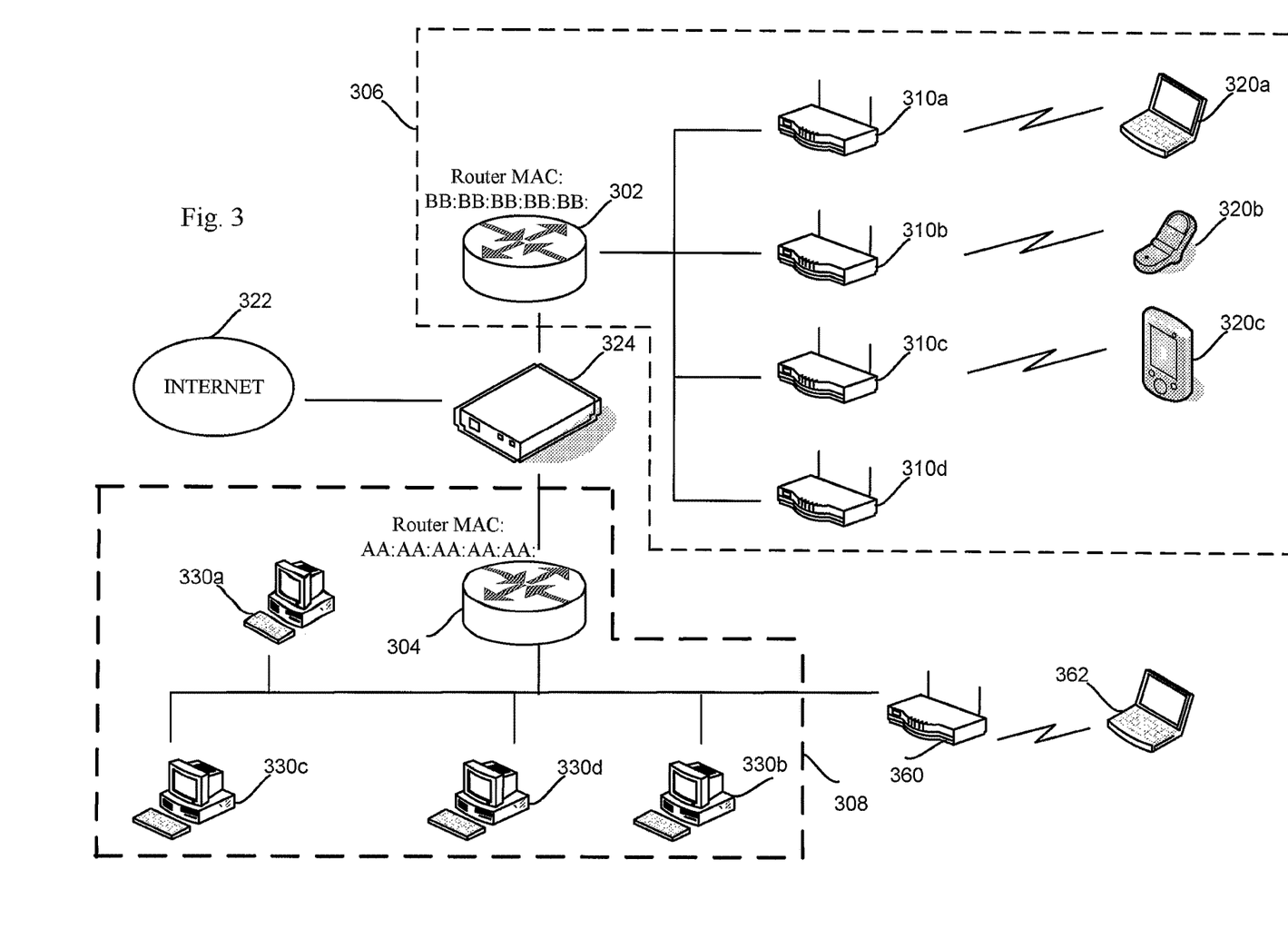
FIG. 3 illustrates, in accordance with an embodiment of the invention, a method for detecting an unauthorized wireless access point.

FIG. 3 illustrates, in accordance with an embodiment of the invention, a method for detecting an unauthorized wireless access point. In FIG. 3, two logical switches are shown: logical switch 302 and logical switch 304. Logical switch 302 implements a wireless-authorized VLAN 306 while logical switch 304 implements a VLAN 308 which is pre-designated to be a VLAN on which wireless devices are not authorized. Note that logical switch 302 and 304 are both logical in the sense that they represent the logical switching mechanism for devices connected to their respective VLANs. As discussed, VLANs and thus these logical switches may be implemented in any number of physical switches. Further, the connecting lines between the logical switches and their devices in FIG. 3 should be understood to represent logical connections. In actual physical terms, these devices may be physically located in different segments of the physical LAN.

As shown in FIG. 2, VLAN 308 comprises four desktop computers 330(a)-330(d) coupled to switch 304. VLAN 306, on the other hand, comprises four wireless routers 310(a)-310(d) coupled to switch 302. These wireless routers, being implemented on a wireless-authorized VLAN, represent the authorized wireless access points through which wireless devices, such as a laptop computer 320(a), a cell phone 320(b) or a PDA 320(c), may communicate with the intranet and the internet 322 via a gateway device 324. The number of desktop devices, laptop devices, wireless access points (as well as other devices not shown) may vary from those shown in FIG. 2 according to need.

Logical switch 302 is shown associated with an example MAC (media access controller) address BB:BB:BB:BB:BB whereas logical switch 304 is shown associated with an example MAC (media access controller) address AA:AA:AA:AA:AA. A packet received at gateway device 324 thus has a source MAC address of either BB:BB:BB:BB:BB or AA:AA:AA:AA:AA in the example of FIG. 3.

Suppose a packet is received at gateway device 324 from laptop computer 320(a). First, it is ascertained whether the packet is received from a wireless device (such as one of laptop computer 320(a), a cell phone 320(b) or a PDA 320(c)). In an embodiment, a vulnerability assessment program is implemented in gateway device 324, requiring each device in the intranet to report the status of its security options (such as software patches, whether an anti-virus program is installed, the type of access, etc.) to gateway device 324. If a device is found to be lacking in security, remedial action may be required before access to the external network (e.g., the internet 322) is allowed. Part of the security options report may include, in an embodiment, an indication whether the device employs the wireless medium for communication. The device ID, along with its communication method, may then be stored in a configuration database or table by gateway device 324 to ascertain whether a packet subsequently received originates from a wireless device or a wired device (by looking up the stored configuration table using the device ID from the packet header, for example). In an embodiment, the reporting by devices of the intranet is accomplished using a software agent installed at the devices when the devices register with the intranet or with gateway device 324 for the purpose of security assessment.

At any rate, the packet is examined to determine whether the packet is received from a wireless device or a wired device. If the packet is determined to have been received from a wireless device, a further check is made to ascertain whether the source MAC address is associated with one of the wireless-authorized VLANs. For example, if the packet is received from laptop computer 320a (which is implemented on VLAN 306, a wireless-authorized VLAN), the source MAC address will be BB:BB:BB:BB:BB in the example of FIG. 3. In this case, the packet is deemed to have been transmitted through an authorized wireless access point.

On the other hand, suppose an employee plugs a wireless router 360 into VLAN 308 to enable laptop computer 362 to access the intranet. In this case, a packet received at gateway device 324 from laptop computer 362 will be ascertained to have been received from a wireless device. Further, the packet is ascertained to have been received from a VLAN that is not authorized for wireless devices since the source MAC address associated with such a packet would reflect AA:AA:AA:AA:AA in the example of FIG. 3. Accordingly, the packet is deemed to have been transmitted through an unauthorized wireless access point.

At this point, remedial actions may be taken. For example, access by any device through access point 360 may, in an embodiment, be blocked. As another example, the method may, in an embodiment, flag the packet as one that has been sent through an unauthorized wireless access point so that IT personnel may follow up with certain remedial actions. As another example, the method may, in an embodiment, flag the source MAC address as a MAC address of a device associated with a subnetwork having thereon an unauthorized wireless access point so that IT personnel may follow up with certain remedial actions. As yet another example, the method, in an embodiment, may flag a subnetwork through which said packet received at said gateway device is transmitted as a subnetwork having thereon an unauthorized wireless access point. These remedial actions are only illustrative and other remedial actions are possible.

Figure 4:
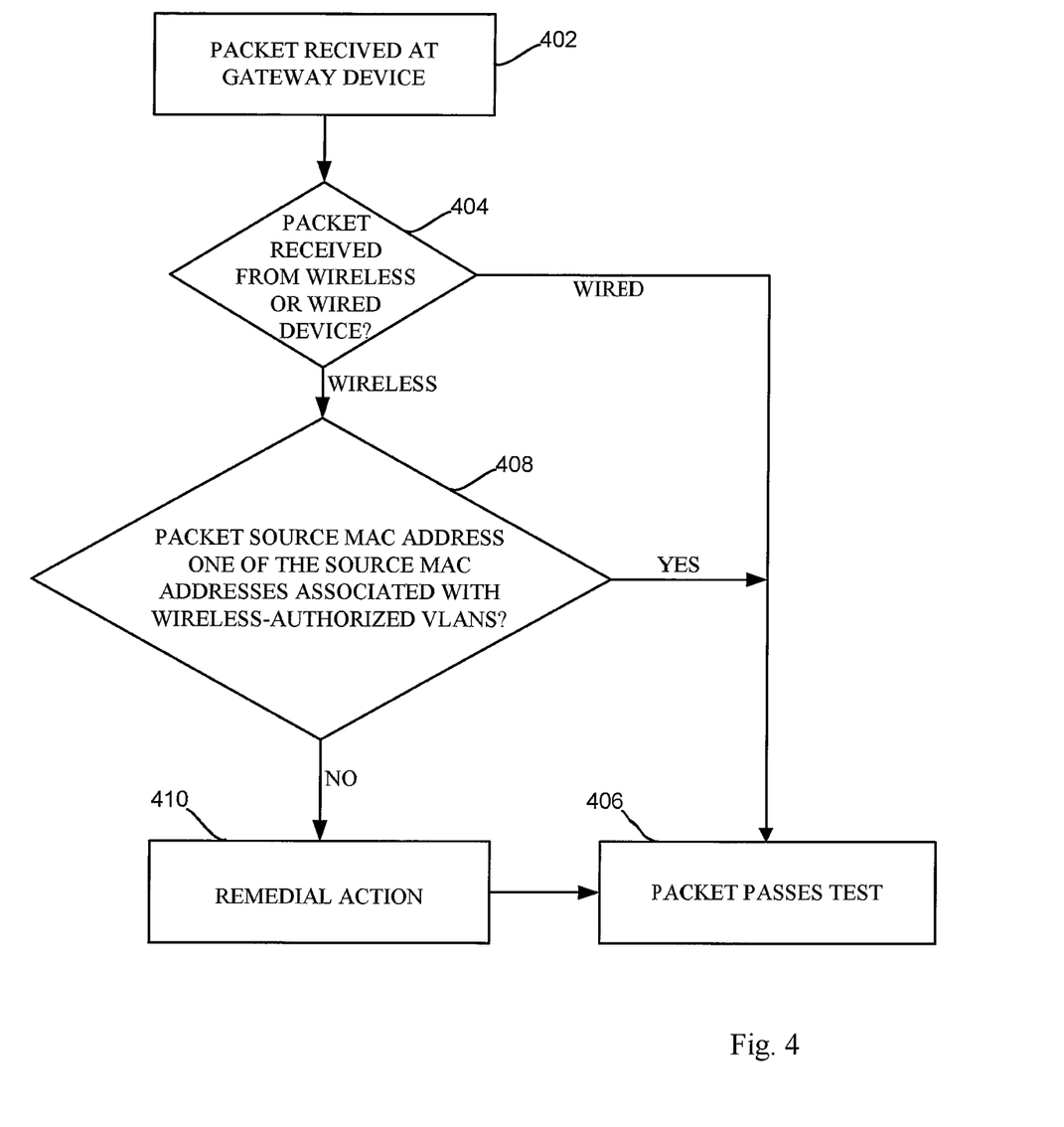
FIG. 4 illustrates, in accordance with an embodiment of the invention, the steps for detecting the presence of an unauthorized wireless access point in an intranet.

FIG. 4 illustrates, in accordance with an embodiment of the invention, the steps for detecting the presence of an unauthorized wireless access point in an intranet. In step 402, a packet is received at the gateway device. In step 404, it is ascertained whether the packet is received from a wireless device or a wired device. If the packet is received from a wired device (the "wired device" path from block 404), no unauthorized wireless access device is deemed to have been traversed by this packet since the packet did not arrive from a wireless device. At this point, the packet is deemed to have passed the test (406). On the other hand, if the packet is received from a wireless device (the "wireless device" path from block 404), a further check is made in step 408.

In step 408, it is ascertained whether the source MAC address of the packet is one of the MAC addresses associated with the set of wireless-authorized VLANs. If the source MAC address of the packet is one of the MAC addresses associated with the set of wireless-authorized VLANs (the "yes" path from block 408), the packet is deemed to have passed the test (406) since the packet is received from a wireless-authorized VLAN.

On the other hand, if the source MAC address of the packet is not one of the MAC addresses associated with the set of wireless-authorized VLANs (the "no" path from block 408), the packet is deemed to have traversed an unauthorized wireless access point, and remedial action is required (410).

Figure 5:
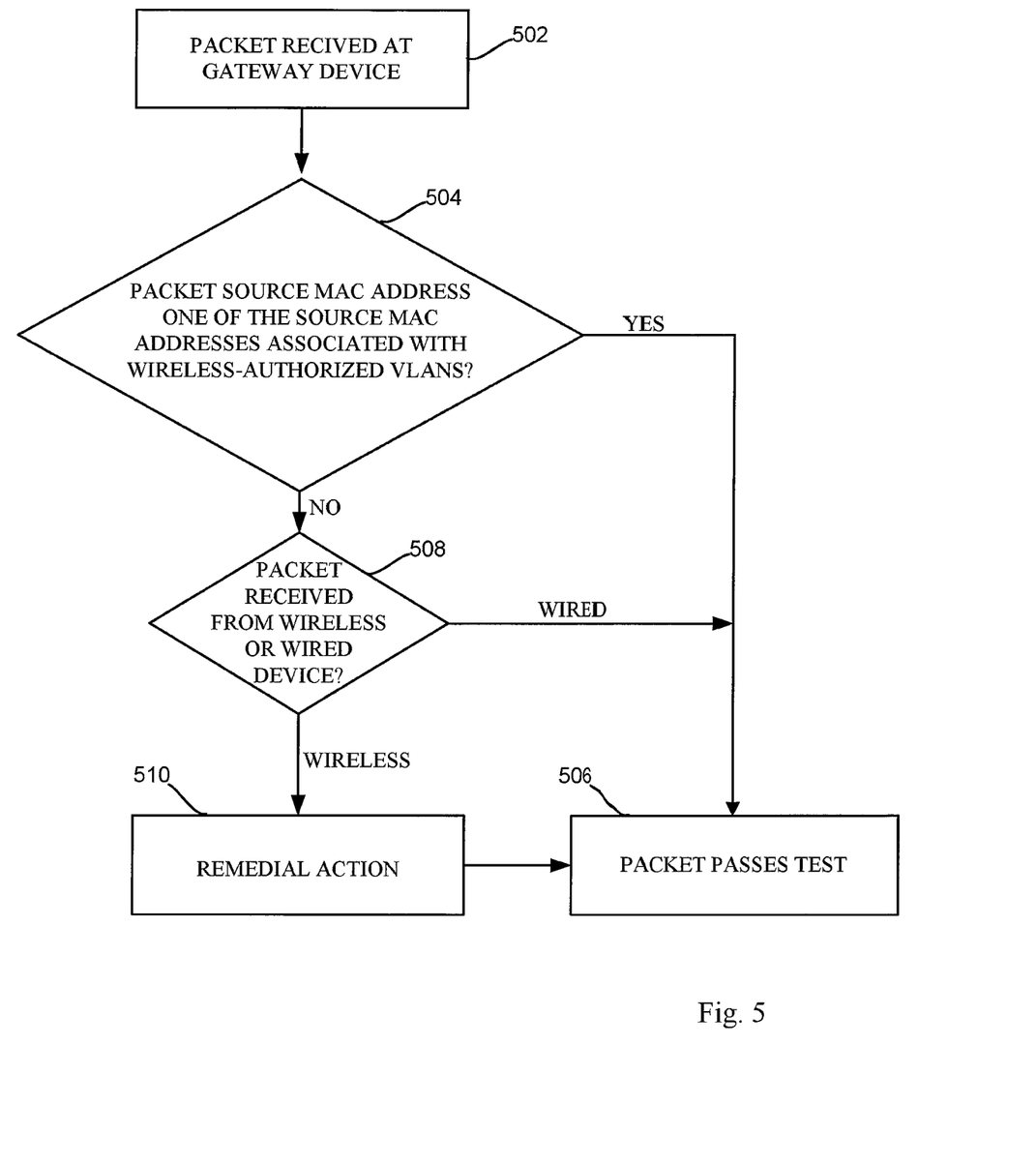
FIG. 5 illustrates, in accordance with another embodiment of the invention, the steps for detecting the presence of an unauthorized wireless access point in an intranet.

Note that the tests of steps 404 and 408 may be reversed in order if desired. This embodiment is shown in FIG. 5. In step 502, a packet is received at the gateway device. In step 504, it is ascertained whether the source MAC address of the packet is one of the MAC addresses associated with the set of wireless-authorized VLANs. If the source MAC address of the packet is one of the MAC addresses associated with the set of wireless-authorized VLANs (the "yes" path from block 504), the packet is deemed to have passed the test (506) since the packet is received from a wireless-authorized VLAN.

On the other hand, if the source MAC address of the packet is not one of the MAC addresses associated with the set of wireless-authorized VLANs (the "no" path from block 504), a further check may be made to determine whether the packet is received from a wireless device or a wired device (step 508).

If the packet is received from a wired device (the "wired device" path from block 508), no unauthorized wireless access device is deemed to have been traversed by this packet since the packet did not arrive from a wireless device. At this point, the packet is deemed to have passed the test (506).

On the other hand, if the packet is received from a wireless device (the "wireless device" path from block 508), the packet is deemed to have traversed an unauthorized wireless access point, and remedial action is required (510).

As can be appreciated from the foregoing, embodiments of the invention allow the gateway device to automatically ascertain whether an unauthorized wireless access point has been provisioned in the intranet. The detection is performed using existing hardware, eliminating the need to purchase and/or train on dedicated access point detection equipment. Further, the detection is automatic, requiring little or no action on the part of IT personnel to detect the presence of an unauthorized wireless access point. Once the presence of an unauthorized wireless access point is detected, information front the packet (e.g., the unauthorized device ID and/or the source MAC address) may be employed to narrow down the location of the unauthorized wireless access point, allowing IT personnel to rapidly locate the source for security risk.

While this invention has been described in terms of several preferred embodiments, there are alterations, permutations, and equivalents, which fall within the scope of this invention. Although various examples are provided herein, it is intended that these examples be illustrative and not limiting with respect to the invention. It should also be noted that there are many alternative ways of implementing the methods and apparatuses of the present invention. Further, the abstract is provided herein for convenience and should not be employed to construe or limit the overall invention, which is expressed in the claims.

It is therefore intended that the following appended claims be interpreted as including all such alterations, permutations, and equivalents as fall within the true spirit and scope of the present invention.

What is claimed is:

1. An intranet comprising:
a plurality of physical switches that implement a plurality of logical switches, wherein a plurality of wireless-authorized virtual local area networks (VLAN's) of the intranet are implemented using the plurality of logical switches;
a plurality of wireless access points;
a plurality of wireless devices that are authorized to access the intranet, wherein the plurality of wireless devices wirelessly connect to the intranet through the wireless-authorized VLAN's by way of the plurality of wireless access points; and
a gateway device that connects the intranet to the Internet, the gateway device comprising a processor and a memory, the gateway device being programmed to:
receive a first packet that was originated by a first device;
determine whether or not the first device is a wireless device that wirelessly transmitted the first packet from the first device;
determine whether or not a source media access control (MAC) address of the first packet is a MAC address of any of the plurality of logical switches; and
perform a remedial action in response to determining that the first device wirelessly transmitted the first packet from the first device and that the source MAC address of the first packet is not a MAC address of any of the plurality of logical switches.

2. The intranet of claim 1, wherein the remedial action includes blocking the first device from accessing the intranet.

3. The intranet of claim 1, wherein the remedial action includes flagging the first packet as one that has been sent through an unauthorized wireless access point.

4. The intranet of claim 1, wherein the remedial action includes flagging the source MAC address as a MAC address of a suspicious device associated with a subnetwork having thereon an unauthorized access point.

5. The intranet of claim 1, wherein the plurality of wireless access points includes wireless routers.

6. The intranet of claim 1, wherein the gateway device is programmed to:
receive a second packet that was originated by a second device;
determine whether or not the second device wirelessly transmitted the second packet from the second device; and
in response to determining that the second device did not wirelessly transmit the second packet from the second device, deeming that no unauthorized wireless access point has been traversed by the second packet.

7. The intranet of claim 1, wherein the gateway device is programmed to:
receive a third packet that was originated by a third device;
determine whether or not the third device wirelessly transmitted the third packet from the third device;

determine whether or not a source MAC address of the third packet is a MAC address of any of the plurality of logical switches; and in response to determining that the third device wirelessly transmitted the third packet from the third device and that the source MAC address of the third packet is that of a logical switch of the plurality of logical switches, deeming the third packet as having been transmitted through an authorized wireless access point.

\* \* \* \* \*